Patented July 19, 1927.

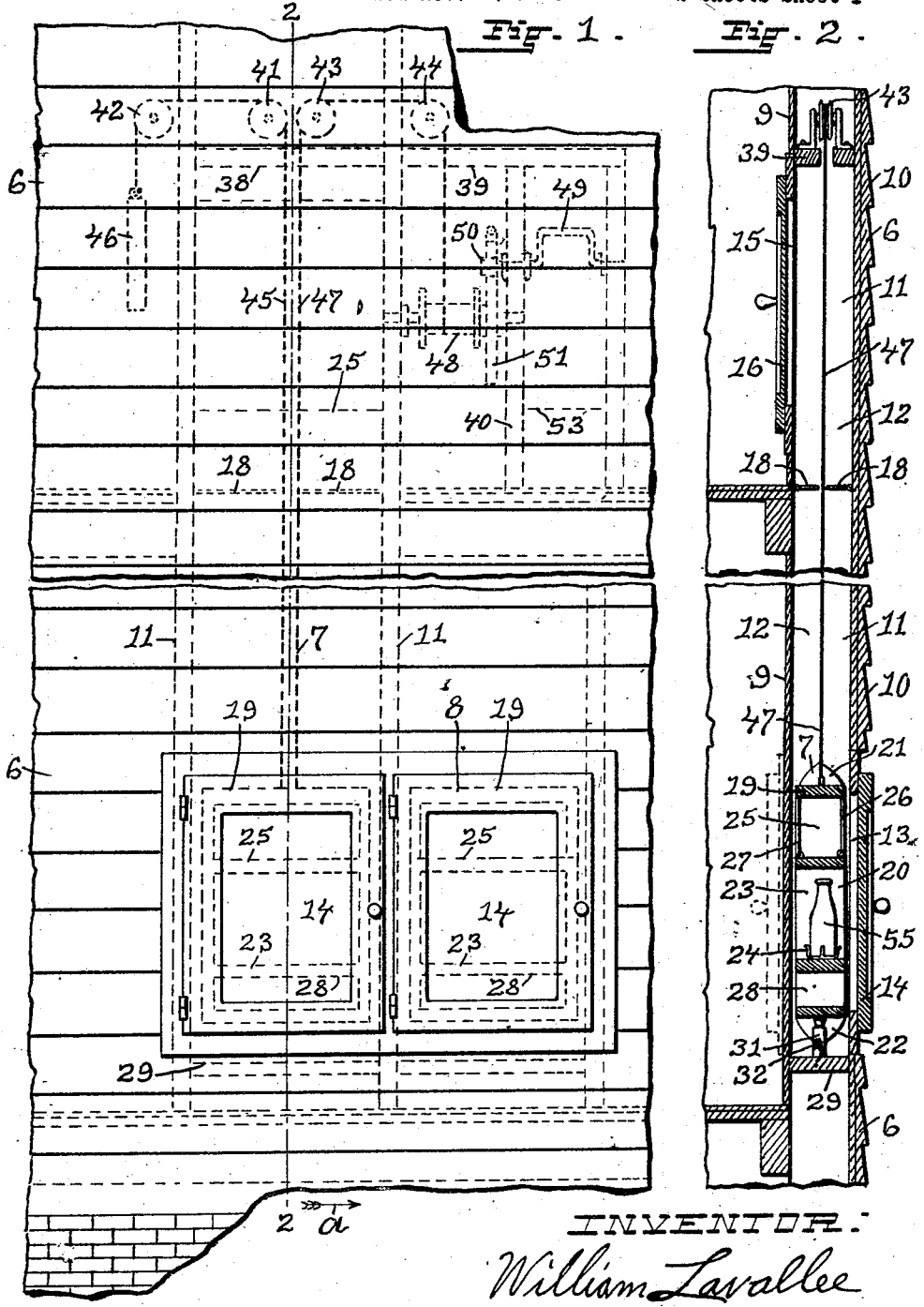

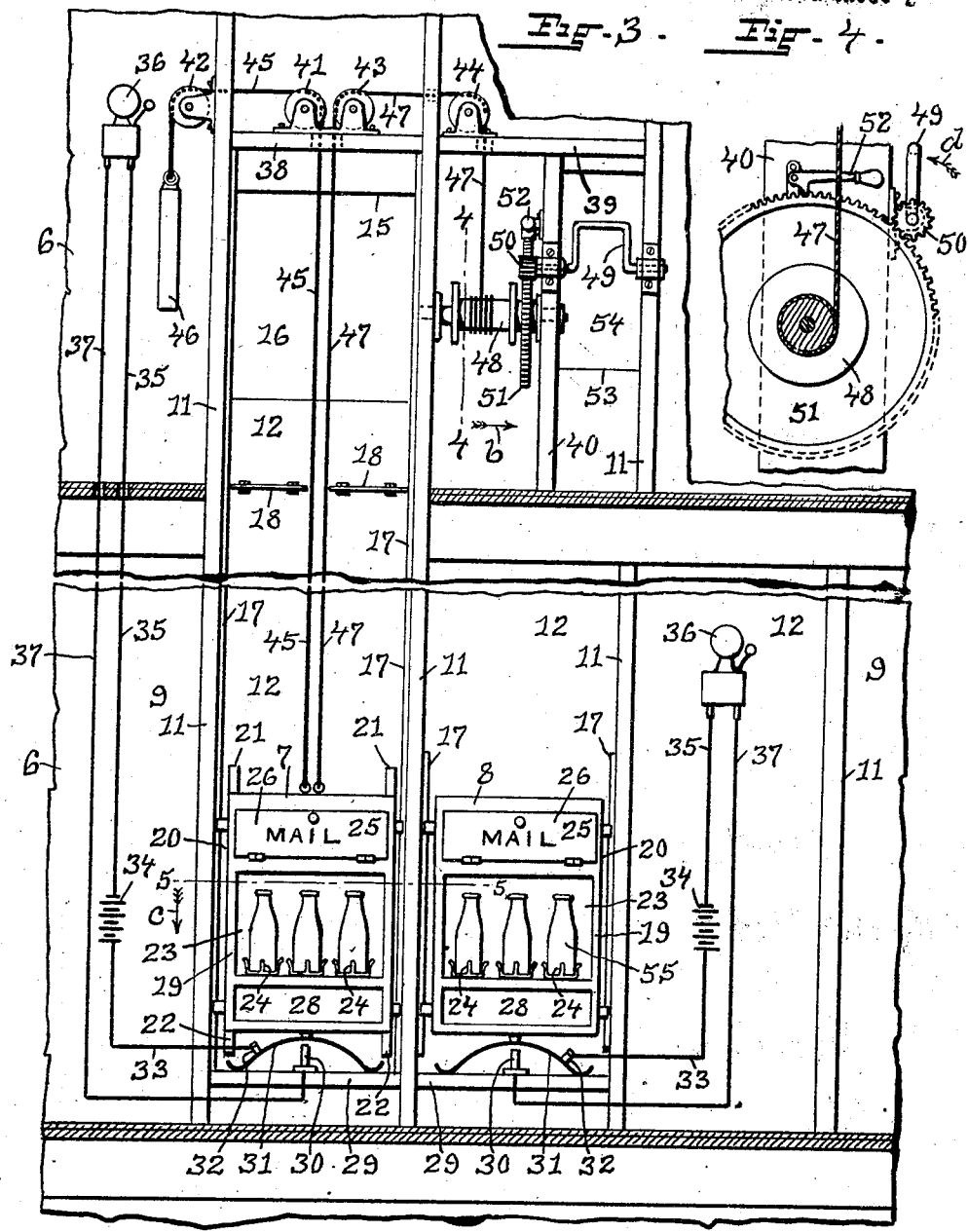

1,636,474

UNITED STATES PATENT OFFICE.

WILLIAM LAVALLEE, OF CENTRAL FALLS, RHODE ISLAND.

DEVICE FOR SANITARY HANDLING OF MILK.

Application filed November 18, 1926. Serial No. 149,265.

My invention has reference to an improvement in the art of sanitary handling of food products and more particularly to an improvement in the sanitary handling of milk.

Milk when left at a house by a milk dealer, is usually left outside at an early hour and unprotected and in warm or hot weather, it may be so left as to spoil in a short time.

The object of my invention is to improve a device for the sanitary handling of milk whereby, when the bottled milk is placed in the handling device, the receiver is instantly notified that the milk is delivered, such device being also provided with means for raising the bottled milk to any upper story in which the tenant resides.

Another object of my invention is to protect the milk containers or bottles, so that animals, such as cats and dogs, cannot contaminate the milk containers or bottles.

A final object of my invention is to simplify the construction of such a device for the sanitary handling of milk, whereby the device may be installed in new or old tenement or apartment houses, at a minimum cost.

My invention consists in the peculiar and novel construction of a device for sanitary handling of milk, said device having details of construction as will be more fully set forth hereinafter and claimed.

Figure 1 is a face view of a portion of the outer wall of a two storied tenement or apartment house provided with my improved device for sanitary handling of milk and showing the central portion of the wall broken away to more clearly show my invention.

Figure 2 is a vertical sectional view through the outer wall taken on line 2, 2, of Figure 1, and looking in the direction of the arrow a.

Figure 3 is a sectional view similar to Figure 1 with the outer boarding and clap-boards of the outer walls removed, to show the construction of the milk handling device.

Figure 4 is an enlarged detail sectional view of part of the raising and lowering mechanism of the device, taken on line 4, 4, of Figure 3 and looking in the direction of the arrow b and, Figure 5 is a horizontal detail sectional view taken on line 5, 5, of Figure 3 and looking in the direction of the arrow c.

In the drawings 6 indicates the outer wall of a house and 7 my improved device for sanitary handling of milk, which is also constructed to handle mail and small packages and 8 a modified form of the device.

The wall 6 has the usual inner portion 9 formed of laths and plaster, the outer portion 10 formed of boarding and clap-boards separated by vertical studdings 11, 11, forming an inclosed vertical space 12, in the form of a rectangular shaped chute, which in a two storied tenement house, extends the height of the outer wall and this space 12, is utilized for the reception of my improved device for the sanitary handling of milk.

In carrying my invention into practice for a two storied two tenement house, an outer entrance doorway 13 is cut through the outer portion 10 of the wall 6 at the lower story and closed by a door 14, an inner egress doorway 15 is cut through the portion 9 of the wall 6 at the upper story or tenement and closed by a door 16 and vertical guide ways 17, 17, are secured centrally to the studdings 11, 11, as shown in Figures 3 and 5. Any usual construction of double fire doors 18, 18, are placed in the space 12 on a line with the floor of the upper tenement, as shown in Figures 2 and 3. The doors 14 and 16 are hinged to the door frames and may be provided with locks, not shown.

Slidably secured to the vertical guide ways 17, 17 is a milk bottle holding member 19 constructed to form the following vertical sides 20, 20 terminating in upper ends 21, 21, and lower ends 22, 22, shaped to open the fire doors 18, 18, on the upward and downward movements of the milk bottle holding member 19. A milk bottle compartment 23 open front and back and having on its bottom spring milk bottle holding clips 24, 24, an upper mail-box 25 closed by an outer hinged door 26 and an inner hinged door 27 and a lower compartment 28 open front and back for small mail packages. This compartment 28 may also be closed by hinged doors, if desired. Below the milk bottle holding member 19 is a lower horizontal strut 29 secured at each end to the studdings 11, 11, and on this strut 29 is a central electrical contact member 30 and on the strut 29 and extending over and normally out of contact with the contact member 30, is a curved spring 31, having a wire connection 32, as shown in Figure 3. A wire 33 goes from the spring wire connection 32 to a battery 34, a wire 35 goes from the battery 34 to an electric bell 36 located in the upper tenement and a wire 37 goes from the bell 36 to the electrical contact member 30. An upper horizontal strut 38, in the upper tenement, is secured at each end to the studding 11 and a similar strut 39 is secured to the studding 11 and a vertical support 40 is secured in place, as shown in Figure 3. Grooved pulleys 41, 42, 43 and 44 are secured to the studding and upper strut. A rope 45 secured at its lower end to the milk bottle holding member 19, goes upwards over the pulleys 41 and 42 and to a counter balance weight 46. An operating rope 47 secured at its lower end to the milk bottle holding member 19, goes upward over the pulleys 43 and 44 and then downwards to a reel 48 rotatably supported in bearings on a studding 11 and support 40. A hand crank 49 is rotatably supported in bearings on a studding 11 and the support 40 and this hand crank 49 is operatively connected to a pinion 50, meshing with a gear 51 fixed to the reel 48. A hand pawl 52 is pivotly secured to the support 40 in a position to engage with the gear 51. A doorway 53 closed by a door 54, is formed in the inner portion 9 of the wall 6 for access to the hand crank 49.

When in use the operation is as follows. When a milk dealer delivers the milk, he opens the lower outer door 14 and places the full bottles of milk in the milk bottle compartment 23 of the milk bottle holding member 19. The weight of the full bottles of milk causes the milk bottle holding member to sink downwards against the tension of the curved spring 31 and depressing the spring 31 causes it to contact with the electrical contact member 30, thereby through the wires 33, battery 34, wire 35, electric bell 36 and wire 37, causing the bell 36 in the upper tenement to ring, thus notifying the tenant that the milk has been delivered. The tenant then opens the door 54 and turns the hand crank 49 in the direction of the arrow $d$, as shown in Figure 4, thereby winding the rope 47 on the reel 48 and raising the milk bottle holding member 19, with the full bottles of milk, to the upper tenement where the full bottles of milk are removed from the milk bottle holding member 19, through the doorway 15, by opening the door 16. Empty milk bottles are now placed in the milk bottle holding member 19 and the above operations reversed. The milkman removes the empty milk bottles from the milk bottle holding member 19 which has now reached the lower or street position, as shown in Figure 3, which shows the spring 31 out of electrical contact with the electrical contact member 30, the empty milk bottles having insufficient weight to cause this electrical contact. Mail and small packages can thus be raised to any upper tenant, thus eliminating, as heretofore, the necessity of the upper tenant from going down to the first or street floor to receive milk, mail or small packages.

I do not confine myself to the exact construction shown, as the same may be modified within the scope of the appended claims.

Having thus described my invention I claim as new:—

1. In a device of the kind described, in combination with the outer wall of a house having a vertical chute connecting the lower story with an upper story, said chute having a lower outside entrance opening and an upper inside egress opening, a milk bottle receiving receptacle having an entrance opening and an egress opening, spring clips for detachably securing the milk bottles in place, means for raising the milk bottle receiving receptacle to an upper story and automatic means for signalling the upper story that the milk has been placed in the milk bottle receiving receptacle.

2. In a device of the kind described, the combination with a vertical movable device 7 in the form of a box having a shelf for holding a milk bottle, of an automatic electric signaling device comprising a fixed electric contact member 30, a curved spring 31 over the contact member 30 and having an electric wire connection 32, a wire 33 connecting the connection 32 with a battery 34, a wire 35, connecting the battery 34 with a bell 36 and a wire 37 connecting the bell 36 with the electric contact member 30, whereby the weight of full bottles of milk in the device 7 will cause the spring 31 to contact with the contact member 30 and ring the bell.

3. In a device of the kind described, the combination of the following instrumentalities, a milk handling device 7 slidably secured in a vertical space in the wall of a house, said device having a milk bottle holding compartment 23, an upper mail box 25, a lower parcel compartment 28, an elevating device comprising a reel 48 rotatably supported in bearings, pulleys 43 and 44 rotatably supported on bearings, a rope 47 secured at its lower end to the milk handling device 7, said rope going over the pulleys 43 and 44 and wound on the reel 48, a gear 51 fixed to the reel 48, a pawl 52 engaging the gear 51 and a hand crank 49 rotatably supported in bearings and having a pinion 50 meshing with the gear 51, for the purpose as described.

In testimony whereof, I have signed my name to this specification.

WILLIAM LAVALLEE.